Dec. 8, 1953  W. M. WINSLOW  2,661,825
HIGH FIDELITY SLIP CONTROL
Filed Jan. 7, 1949  2 Sheets-Sheet 1

INVENTOR:
WILLIS M. WINSLOW
BY
ATTORNEYS.

Dec. 8, 1953 — W. M. WINSLOW — 2,661,825
HIGH FIDELITY SLIP CONTROL
Filed Jan. 7, 1949 — 2 Sheets-Sheet 2

INVENTOR:
WILLIS M. WINSLOW
BY Bruinga and Sutherland
ATTORNEYS.

Patented Dec. 8, 1953

2,661,825

UNITED STATES PATENT OFFICE 2,661,825

HIGH FIDELITY SLIP CONTROL

Willis M. Winslow, Wheatridge, Colo., assignor to Wefco Inc., Denver, Colo., a corporation of Colorado Application January 7, 1949, Serial No. 69,645

3 Claims. (Cl. 192—21.5)

The present invention relates to slip control between relatively movable parts, such as in a clutch between a driving and a driven member, or in a brake between a moving member and a stationary member.

While clutches have heretofore been provided in great variety, accurate control of the degree of slip between the parts has been difficult to achieve and, where slip has been controlled, it has generally been at the expense of mechanical wear or inability to obtain zero slippage.

In many industrial fields, it is desirable to automatically control the speed at which a machine part moves in accordance with operating conditions at the moment. Examples are the starting of electric motors having a high starting torque and driving high inertia loads; the operation of electric motors under suddenly changing loads; the reeling and unreeling of materials on cores of constantly increasing or decreasing diameter; and condition control and servo mechanisms in great variety.

The object of the present invention is to provide an apparatus for controlling slip instantaneously and throughout the entire range from "lock-in" to free.

Another object is to provide an apparatus of the kind described wherein the slip is varied in proportion to variations in an electrical control voltage.

A further object is to provide a wide and progressive range of variation in the shear-resistance of a force-transmitting fluid medium wherein entrained solid particles respond to a flux field established either electrically or magnetically.

A more specific object is to control by variations of electrical current or voltage, or both, the slippage in a force-transmitting means embodying a fluid having solid particles entrained therein responsive to field forces causing an attraction between the particles to thereby establish a shear-resistant medium.

A further and general object is to produce a force-transmitting means that can be varied progressively between conditions of maximum and minimum slippage which can be so controlled that there will be a smooth change between the forces being caused to be transmitted.

Other objects will become apparent to those skilled in the art when the following description is read in connection with the accompanying drawings, wherein.

Figure 1:
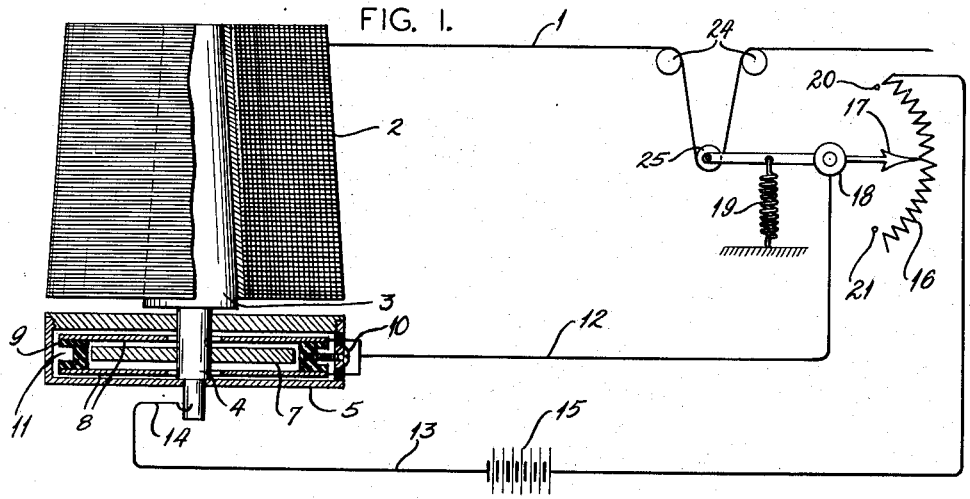
Figure 1 is a diagrammatic view illustrating an embodiment of the present invention as applied to the automatic control of slip by utilizing an electric flux field and varying it in accordance with varaition in tension of a reeled strand.

In accordance with the present invention, generally stated, several parts between which relative slip is to occur are provided with means for establishing a flux (either electric or magnetic) field between them, and the intervening space is charged with a flux field responsive medium. Regardless of whether the relatively slippable parts are equipped for electrical or magnetic flux fields, the invention contemplates that the intensity of the flux field be subject to variation either at the will of an operator or automatically in response to some chosen condition. Such variation of flux fields, either electric or magnetic (where the magnetism is electrically created), may be accomplished by appropriate variation of the output of an electrical control circuit which excites the flux field.

By "flux field responsive medium," as that expression is herein used, is meant a mixture of a liquid (which per se is not affected by the flux field) laden with (solid or semi-solid) particles which, when entrained in the liquid, respond to the flux field by each particle associating with its neighbors into shear-resistant chains thus producing a pronounced apparent increase in the viscosity of the mixture. If the flux field is magnetic, the particles must be, to some extent at least, magnetically conductive and, if the flux field is electric, the particles must to some extent be electrically conductive or have a dielectric constant many times greater than that of their entraining liquid. Thus the individual particles are capable of simultaneously carrying opposite electric charges.

Typical examples of such flux field responsive media are:

For magnetic flux fields:

Example A 500 grams carbonyl iron powder (0.1 to 1 microns)
50 cc. light weight mineral oil (viscosity of 2–10 centipoises)
0.4 gram aluminum tristearate
1.8 grams aluminum distearate The aluminum tri- and distearate are heated with the oil to effect solution before adding the iron powder and, after the ingredientes have all been brought together, they are thoroughly mixed to provide uniformity throughout the mass.

Example B 3 grams lithium stearate
7 grams lithium ricinoleate
0.5 gram phenyl alpha naphthylamine
90 grams light weight mineral oil (viscosity of 2–10 centipoises)

The above ingredients are heated to form a light grease, which is then added to 1200 grams micron-sized carbonyl iron powder with thorough mixing to provide uniformity throughout the mass. The "carbonyl iron powder" referred to in Examples A and B is an article of commerce in the form of spheres and near spheres of nearly pure iron having a size range from 0.1 to 10. microns in diameter. Of these, the size range of 0.1 to 1.0 microns is preferred although sizes up to 10 microns are operative. The metallic "soaps" of the foregoing formulas serve as surface active agents, coating the particles with a lubricative skin; in addition, they have gel-forming properties which render these fluids thixotropic despite the fact that the vehicles used are of very low viscosity.

The employment of dispersing agents such as the fatty acid salts and esters of the foregoing examples is based on applicant's discovery that with their presence the induced shear resistance of the fluid will correspond to and follow with high fidelity the varying magnitudes of the applied field. Contrary to first expectations, the presence of these agents does not preclude increasing force-transmitting contact of the particles under action of an increasing applied field and the induced shear resistance of the fluid is found to be only moderately less in magnitude than that of a fluid not containing a dispersing agent. On the other hand, it is found that under action of decreasing applied field the shear resistance of a fluid containing a dispersing agent will immediately decrease in correspondence to the field, whereas shear resistance of a fluid not containing such an agent will continue to persist at a magnitude corresponding to the preceding maximum field strength after the field strength has been reduced.

For electric flux fields:

Example C 100 grams dry ground silica gel (about 0.1 to 1.0 micron particle diameter)
15 cc. sorbitol sesquioleate ("Arlacel C")
50 cc. kerosene
1.1 gram lauryl pyridinium chloride
3.3 cc. ethylene glycol mono-ethyl ether ("Cellosolve")
5 grams white tin oxide (stannic)

The sorbitol sesquioleate, kerosene, and lauryl pyridinium chloride are heated to effect solution and the remaining ingredients are then added with thorough mixing to obtain uniform dispersion throughout the mass.

Example D 100 grams dry ground silica gel (about 0.1 to 1.0 micron particle diameter)
15 cc. sorbitol sesquioleate ("Arlacel C")
1 gram sodium borate ("Borax")
3 cc. concentrated water glass colloid or solution
12 cc. water
50 cc. kerosene The kerosene, sorbitol sesquioleate, and borate are heated to effect solution, the water is then added with agitation to form an emulsion, and the other ingredients are then thoroughly mixed in to provide uniformity throughout the mass.

Other examples of such electric flux field responsive media are given in my copending now abandoned application Serial No. 716,626, filed December 16, 1946, of which this application is a continuation-in-part, and my Patent No. 2,417,850, granted March 25, 1947.

The formula for the flux field responsive fluids as disclosed herein are such that the fluids are of non-lock or self-breaking type, by which is meant that the particles are normally self-dispersed and the fibrous coagulation produced by the field does not persist when the field is removed. This self-breaking quality is brought about primarily by the surface active agents, as more fully set forth in said copending application, and such quality very substantially improves the speed of response.

Figure 2:
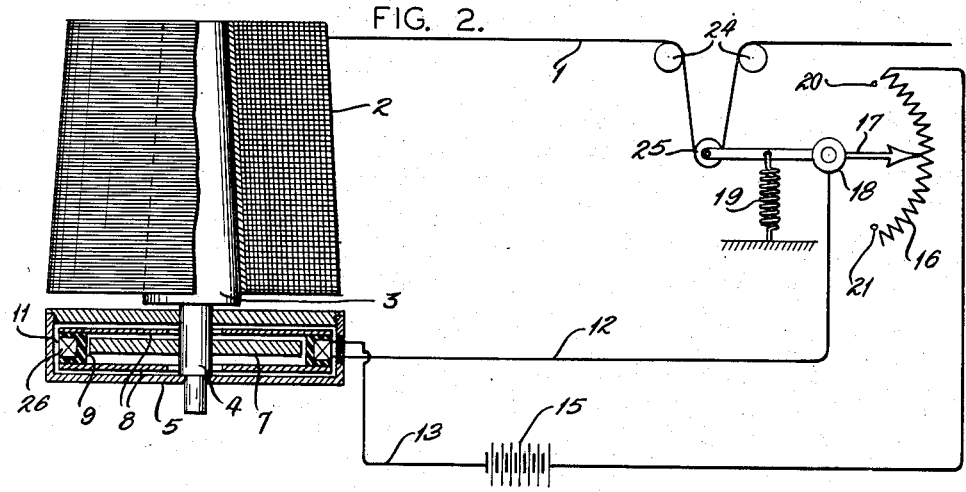
Figure 2 is a view corresponding to Figure 1, but differing therefrom in that the slip control involves the use of a magnetic flux field.

Among the simplest embodiments of the invention is an apparatus for controlling slip in accordance with the tension in a strand being unwound from a coil, as shown diagrammatically in Figures 1 and 2.

In Figure 1, a strand 1 is in the process of being unwound from a coil 2. The coil 2 is mounted upon a mandrel 3, which is carried by a rotatable shaft 4, and sustained by a housing 5. Rigidly secured to the shaft 4, so as to be rotatable therewith, is a metallic disc 7 extending radially from the shaft within the housing 5. Situated above and below the disc 7, but spaced therefrom for a distance on the order of 0.02 of an inch, is a pair of metallic plates 8 mounted upon opposite faces of an axial ring 9. The ring 9 is secured to housing 5 by any suitable means as, for example, screws 10. In the embodiment shown, the ring 9 is of dielectric material so as to insulate the conductive plates 8 from the housing 5, but if the housing 5 be of insulating material, the ring 9 may be of conductive material, because in either event it is contemplated that the plates 8 be of the same polarity. The parts 7, 8, and 9 are enclosed within a space 11 surrounded by housing 5, and such space, in the embodiment shown in Figure 1, is filled with an electric flux field responsive medium of the character aforesaid.

With an apparatus of the kind shown, an electric flux field is applied between disc 7 and plates 8, the same being excited by an electrical potential (either A. C. or D. C.) applied through a conductor 12 (insulated from housing 5) connected with discs 8, and a conductor 13, connected by means of a brush 14, to shaft 4.

Alternatively (where the plates 8 are insulated one from the other), the flux field may be set up with the respective plates 8 at opposite polarity (and the disc 7 as an infield conductor) by connecting one of plates 8 to conductor 12 and the other to conductor 13. In this instance, however, the potential difference between the relatively slippable parts (7 and 8) is but half that achieved when the plates 8 are of one polarity and disc 7 of opposite.

The conductors 12 and 13 are energized by a suitable source of electric power, such as battery 15. In series between battery 15 and conductor 12 is a variable resistor 16 so arranged as to vary the potential difference between conductors 12 and 13. The amount of the resistance which is connected in the circuit is controlled by the position of a movable contact 17, which is on a lever pivoted at 18 and biased by spring 19 toward the position whereat all of the resistance 16 is cut out. In the latter position, contact 17 comes to rest against stop 20. In order to move the contact 17 in the direction which increases the amount of resistance in the circuit, the strand 1 is offset from rectilinear travel between a pair of rollers 24 by bringing the strand under a roller 25 carried by the end of the lever upon which movable contact 17 is mounted. The tension in strand 1 thus tends to move contact 17 clockwise toward the limiting position whereat it engages stop 21.

With an arrangement of the kind described, the output potential of control circuit (between leads 12 and 13), and consequently the potential difference between disc 7 and plates 8, is inversely proportional to the amount of resistance 16, which at any increment of time is in circuit, and the latter is at all times directly proportional to the tension in strand 1. Consequently, if the tension in strand 1 is reduced, the contact 17 is moved to introduce less of the resistance 16 into the circuit and such results in an increase of the potential applied across the space between disc 7 and plates 8. As the potential across said space increases, the apparent viscosity of the flux field responsive medium in space 11 increases and the torque between the discs 7 and 8 is increased. Such increase applies an increased braking against the rotation of shaft 4 and automatically effects an increase in the tension of strand 1.

In an arrangement of the kind just described, it is contemplated that some braking force will exist between the discs 7 and 8 at all times, and it is also contemplated that the potential across said discs never reach a magnitude whereat the parts are locked against relative movement.

In the illustrated embodiment, the housing 5 is formed of conducting material and the plates 8 are insulated therefrom, but the housing may be formed of insulating material and plates 8 fastened directly thereto. Where the flux field is magnetically excited, however, it is preferable that the housing 5 be formed of non-magnetic material, such as brass or insulating material.

In the embodiment shown in Figure 2, the arrangement is identical with that shown in Figure 1 save that the flux field is magnetically excited. In this instance, an annular coil of wire 26 is disposed between plates 8 radially outward from the edge of disc 7. In this instance, the disc 7 and plates 8 must be made of magnetic material. The terminals of coil 26 are connected to conductors 12 and 13 and the operation is identical with the operation of the embodiment shown in Figure 1 save that the flux field responsive medium, with which space 11 is charged, is magnetically responsive.

While in the embodiments shown in Figures 1 and 2, the disc 7 and the plates 8 are relatively movable although the latter are stationary, it should be apparent that the plates 8 can be made actually movable, as by mounting them (and housing 5) on a motor shaft, in which event the apparatus can be used for in-winding a strand under constant tension.

Figure 3:
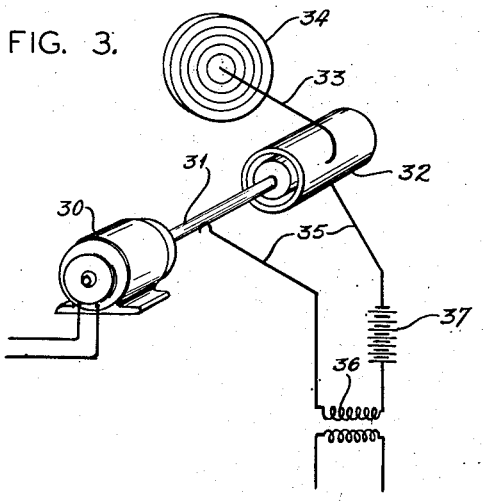
Figure 3 is a diagrammatic view illustrating the application of the present invention in sound amplification.

Referring now to Figure 3 for a further example, the invention is shown as embodied in a sound amplification apparatus. A constant-slow-speed electric motor 30 drives a shaft 31, on the end of which is provided a clutch 32 of the general character disclosed in my Patent No. 2,417,850 wherein an interior part (connected to shaft 31) is slippable relative to an exterior part which is of opposite (electrical or magnetic) polarity. The clutch 32 may be of the form illustrated in Figure 8 or Figure 9 of this application to be described more in detail hereinafter, depending upon whether the clutch is charged with a flux field responsive medium of the electric or of the magnetic type. In the form shown in Figure 3, the clutch 32 is intended to be charged with an electric flux field responsive medium. On the exterior element of clutch 32, a tension member 33 is anchored and extends to a diaphragm 34 of the character utilized in a loud speaker. Between the interior and exterior parts of the clutch 32, a varying electric potential is applied through conductors 35 from the secondary of a transformer 36. The primary of the transformer 36 is connected to the receiver circuit of an ordinary radio set, so that audio-frequency variations of current in the primary effect a variation in the potential difference between the conductors 35. Such variation of the potential difference between conductors 35 effects a variation in the slip between the inner and outer members of clutch 32. When the potential difference is high, the inner member of clutch 32 rotates the outer member thereof, and when the potential difference is low, there is less tendency to rotate, and the outer member of clutch 32 is rotated in the opposite direction under the resilience of diaphragm 34. The audio-frequency variations in potential difference present in the ordinary radio receiving set are sufficient to accomplish the range of slip control necessary for reproduction of sound by diaphragm 34, but in the interest of the fidelity it is desirable to adjust the magnitude of the voltage across conductors 35 (without affecting the magnitude of variation in potential difference) by the introduction of a battery 37. Since the relation between torque and voltage in a clutch of the character here involved is parabolic, the introduction of an artificial base voltage, as by battery 37, can bring the operations into a range where the voltage-torque relationship approaches linear (as distinguished from that part of the curve where a high rate of slope change prevails). Such linear relationship is desirable for fidelity of reproduction.

Figure 4:
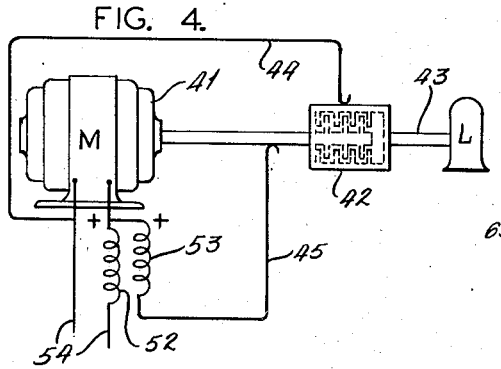
Figure 4 is a diagrammatic view showing another arrangement for controlling slip in accordance with the speed of an electric motor.

An arrangement for accomplishing automatic control of the slip in a clutch in accordance with the operating conditions of a motor and a load is illustrated in Figure 4. In this embodiment, a single-phase alternating current motor 41 is connected through a clutch 42 to a load L. The clutch 42 is of the general character taught by my Patent No. 2,417,850, but may be of the specific type shown in Figure 8 or 9 hereof. In either event, the exterior element of the clutch is secured for rotation with the shaft 43 of load L, the interior element of the clutch is secured for rotation with the shaft of motor 41, and the space between the interior and exterior clutch parts is packed with flux field responsive medium of the selected type. In the form shown, the clutch 42 is responsive to an electric flux field, the intensity of which varies with the potential difference between conductors 44 and 45 (connected respectively to the exterior and interior elements of clutch 42). In this instance, the controlled potential difference between conductors 44 and 45 is accomplished by means of a current transformer 52, the secondary 53 of which is connected to buck the voltage of the power circuit 54. Consequently, when the current traversing the motor 41 is of a high order of magnitude, as upon starting, a relatively high voltage is induced in winding 53. This induced voltage bucks the line voltage with the result that there is not sufficient potential difference between the conductors 44 and 45 to energize clutch 42. As the magnitude of current to the motor 41 decreases, the voltage induced in winding 53 also decreases, so that the potential difference between conductors 44 and 45 approaches the potential difference between conductors 54 as the speed of the motor 41 increases. A sudden increase in load L will increase the current traversing the primary of transformer 52, reduce the potential across conductors 44 and 45, and permit slip. In Figure 4, the primary of current transformer 52 is disclosed as a part of an external transformer, but it is obvious that this primary may be a part of or all of the field windings of the motor M and, in such case, the secondary winding 53 may likewise be suitably placed in the motor so as to be subject to the inductive influences of the motor field winding; it being understood that, in this instance also, the windings are arranged so that the output potential of winding 53 bucks the line potential. While a single phase motor has been shown, by way of illustration, it is understood that the same principles can be applied with equal efficiencies to any alternating current motor whether it be single or polyphase.

Figure 5:
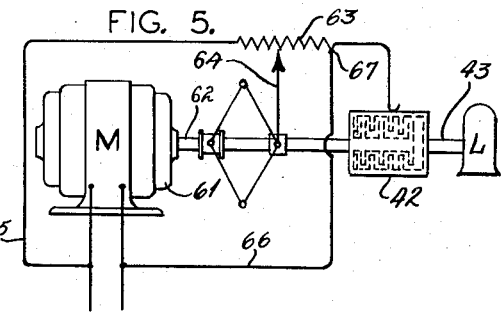
Figure 5 is a diagrammatic view showing another embodiment wherein slip is controlled in accordance with the speed of an electric motor.
Figure 6:
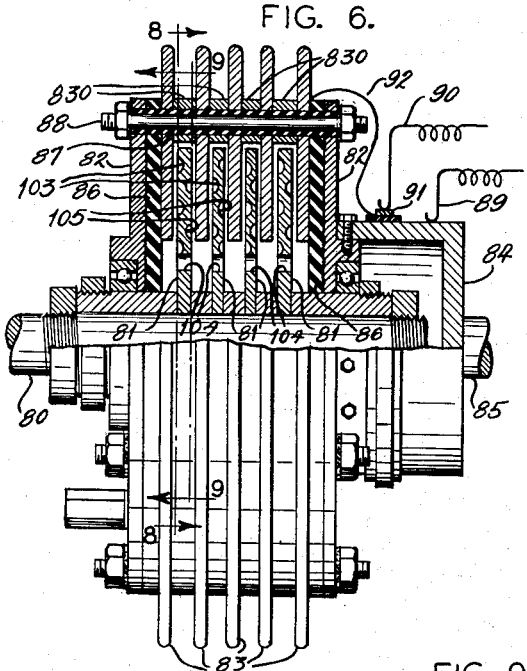
Figure 6 is a view in side elevation, part being in section, of a clutch adapted to be engaged by an electric flux field and suitable for use in the embodiments shown in Figures 3 to 5, inclusive.

In the form shown in Figure 5, a motor 61, which may be either a direct or alternating current motor, is connected through a clutch 42 to a load L. The clutch is of the type indicated in the previous embodiment and, as before, has its exterior member secured for rotation with the driven shaft. On the driving shaft 62 between the motor and the clutch, a speed-responsive rheostat 63 is provided, so that the movable contact 64 is electrically connected with shaft 62, which is at the same electrical polarity as the internal member of clutch 42. The rheostat 63 is arranged so that, as the speed of motor 61 increases, the amount of resistance between conductor 65 and movable contact 64 is reduced. Conductor 66 is connected at one end 67 of the rheostat 63, but extends therebeyond to the exterior member of clutch 42 and accordingly, at any increment of time, the potential difference between the clutch parts depends upon the amount of resistance between contact 64 and terminal 67. At start and at low speeds, the movable contact 64 will be positioned near end 67 of the rheostat, so that there will be a low potential difference between conductor 66 and contact 64, but as the speed of the motor increases, such potential difference will increase and accordingly the slip allowed by clutch 42 will decrease.

Where the clutch 42 in the foregoing examples is responsive to an electric flux field, the clutch may be constructed as shown in Figure 6, wherein the interior or driving member of the clutch unit is connected to a shaft 80 and is provided with a succession of discs 81 (of iron, steel, or other conductor) mounted in axially spaced relation, but each electrically connected with shaft 80. Surrounding the discs 81 is a housing formed of end plates 82 and a series of spaced annular plates 83 of electrically conductive material, such as iron or steel. Although the end plates 82 are shown as metallic, they may be of insulating material, but for the sake of illustration may be considered as brass. One of the end plates 82 is connected through a hub 84 to the driven shaft 85. The several plates 83 are electrically connected with each other, but insulated from the end plates 82 and the adjunct parts of shaft 80. To accomplish the desired mechanical connection and provide such insulation, insulating members 86 are arranged adjacent the end plates 82; and the several plates 83 separated by metallic rings 830 are assembled on a series of brass through-bolts 88. Each of the bolts 88 extends through the end plates 82 and consequently must be electrically insulated from parts of opposite polarity as by the provision of insulating sleeves 87 on each of the bolts 88 and insulating washers at the nuts on each end.

The plates 83 radially overlap discs 81, but are separated therefrom by a space which may be on the order of between 0.005 and 0.03 inch. The space between discs 81 and plates 83, as well as the space radially inward of plates 83 and rings 830, is filled with an electric flux responsive medium of the character aforesaid.

With an arrangement of the type shown in Figure 6, shafts 80 and 85, as well as end plates 82 and discs 81, are electrically connected and at the same polarity. Plates 83 are, however, insulated from the parts just mentioned and are at opposite electrical polarity thereto, but are electrically connected by brass rings 830 between them. In order to electrically control the parts and establish a potential difference between them, one side of a control circuit may be connected through a brush 89 with hub 84. The other side of the energizing circuit may be connected through a brush 90 riding upon a slip-ring 91 insulated from hub 84 and electrically connected through a conductor 92 to the several plates 83. The space on the interior of the clutch between the discs 81 and plates 83 is filled with electric flux field responsive medium.

Figure 7:
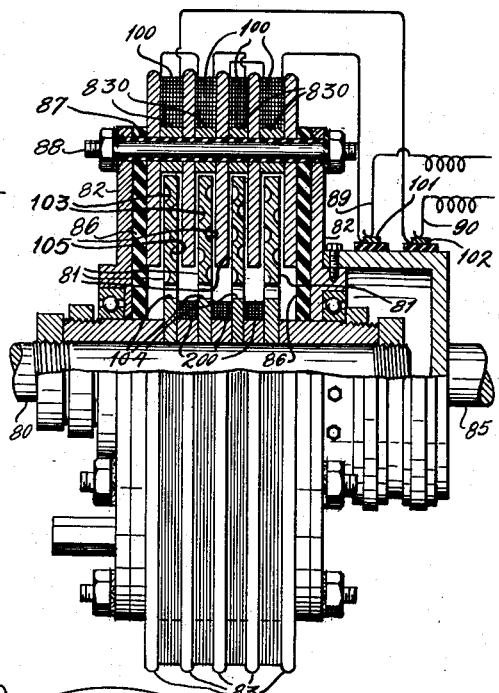
Figure 7 is a view corresponding to Figure 8, showing the clutch adapted to be engaged by a magnetic flux field and suitable for use in the embodiments shown in Figures 3 to 5, inclusive.

A comparable clutch unit adapted to be responsive to a magnetic flux field is shown in Figure 7. The structural parts are identical with those above described in connection with Figure 6, and the same reference numerals appear thereon. In this form it is important that the materials be chosen with reference to the magnetic, rather than their electric, conductivity characteristics. Parts 81 and 83 must be of magnetic material, while parts 82, 830, and 88 should be of non-magnetic material. In addition to the structure shown in Figure 6, however, there is provided a coil of wire 100 in the spaces defined between the plates 83. The several coils 100 may be energized by an electrical potential applied through brushes 89 and 90 riding respectively upon slip-rings 101 and 102, each insulated from hub 84. The coils 100 are shown connected in the electrical circuit so that adjacent coils induce opposite flux and thereby the successive plates alternate in magnetic polarity. If desired, the coils may be otherwise arranged and connected so long as a magnetic flux field is establishable between the discs 81 and the plates 83. If desired, an exterior magnetic path may be provided in the form of a casing about the device. In addition to the coils 100, or as an alternative thereto, a plurality of electromagnetic coils 200 may be disposed on the internal member in the several spaces between the discs 81, as shown at 200. In this case, the energizing circuit for the coils will extend out to slip-rings on shaft 80, with which the coils 200 rotate. With coils 200 and absent coils 100, it is preferable that rings 830 be made of magnetic material. It is obvious that the utilization of both coils 100 and 200 in conjunction with each other will produce the greatest flux field between the relatively moving members 81 and 83 due to the mutual attraction between the pole faces of these two sets of coils, said pole faces being the relatively movable members of the clutch.

The spaces between the discs 81 and plates 83 and rings 830 are, in the form shown in Figure 7, filled with magnetic flux field responsive medium.

Figure 8:
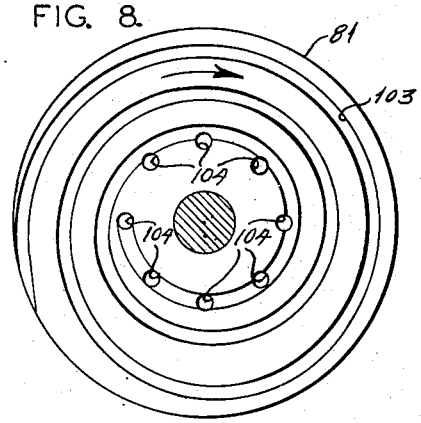
Figure 8 is an elevation of one face of a clutch disc as indicated by the arrow 8—8 in Figure 6.
Figure 9:
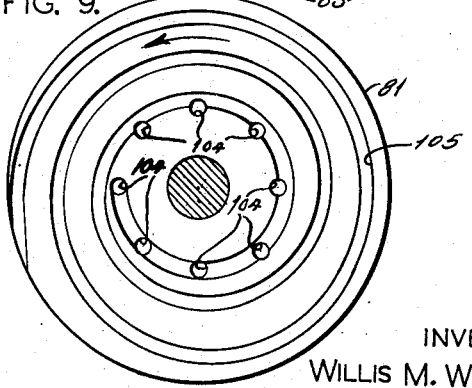
Figure 9 is a similar view of the reverse face of the same disc as indicated by the arrow 9—9 in Figure 6.

In the form shown in Figures 6 and 7, the discs 81 are provided with oppositely spiralling grooves and recirculation orifices. Such a disc is shown in front and back elevation in Figures 8 and 9. In Figure 8, a groove 103 increases in radius counterclockwise so that, when rotated in the direction indicated by the arrow, the tendency would be to work material contiguous therewith radially outward. The opposite side of disc 81 is provided with a groove 105, which spirals in the opposite sense to groove 103, i. e., the same sense as seen from the opposite side (Figure 9), and increases in radius counterclockwise so that, when rotated in the direction indicated by the arrow on Figure 9, the tendency is to work contiguous material radially inward. Since Figures 8 and 9 show the opposite sides of the same disc, the arrows thereon appear to indicate rotation in opposite directions, but such appearance is unreal, as at any increment of time, rotation can be in but one direction about the axis.

Near the center of the disc 81, a series of holes 104 is provided. Consequently, when the clutch is rotating in the direction indicated by the arrows in Figures 8 and 9, a particle of the flux responsive fluid medium located in groove 103 is forced to flow radially outward through the groove 103 until the outer periphery of the disc 81 is reached, whereupon the fluid flows over the edge and back in the opposite side of the same disc through groove 105. Upon reaching the inner extremity of groove 105, the fluid escapes through holes 104 to the opposite side of the disc and resumes its journey outwardly along groove 103.

By thus maintaining the flux field responsive medium in continuous circulation when slip is occurring, any tendency of the suspensoid particles to settle or be segregated by centrifugal force is minimized and the medium is maintained substantially uniform in composition and temperature.

It is to be understood that the slip control devices illustrated in Figures 1 through 11 may be provided with suitable fittings for replacing the flux field responsive medium, venting gases, and the like, and that they may likewise be provided with cooling means, such as water jackets or the like, for dissipating the heat generated during operation.

From the foregoing description those skilled in the art should readily understand the invention and recognize that it accomplishes its objects. While several examples have been given for the purpose of illustration, it is to be distinctly understood that the invention is not limited to the details thereof.

Having thus described the invention, what is claimed and desired to be secured by Letters Patent is:

1. In a mechanical force transmitting control, the combination with closely spaced extensive wall members mounted for relative movement and having their opposed surfaces in general parallelism, a fluid medium occupying the space between said surfaces and comprising a liquid permanently and homogeneously laden with particles which are mutually attractable in the presence of a flux field, means including one of said wall members adapted to continually exert shearing stress on said fluid medium, and means including the other of said wall members adapted to receive shearing stress from said fluid medium, of means applying a continually varying flux field to effect mutual attraction of said particles and thereby impart shearing resistance to said medium and shearing stress to said other wall member, and a dispersing agent blended in said medium for separating the attracted particles during decreasing flux field to thereby cause the shear stress imparted to said other wall member to follow with fidelity the variations of the applied flux field.

2. The control of claim 1 in which said wall members are mounted for rotation relative to each other.

3. The control of claim 2 in which said wall members are each mounted for rotation relative to a fixed point of reference.

WILLIS M. WINSLOW.

References Cited in the file of this patent

UNITED STATES PATENTS

| Number | Name | Date |
|--------|------|------|
| 811,654 | Murphy | Feb. 6, 1906 |
| 908,504 | Sargent | Jan. 5, 1909 |
| 1,112,411 | Ackley | Sept. 29, 1914 |
| 1,533,757 | Rahbek et al. | Apr. 14, 1925 |
| 1,860,375 | Winterer et al. | May 31, 1932 |
| 1,868,910 | Miller | July 26, 1932 |
| 1,902,471 | Thomson | Mar. 21, 1933 |
| 2,025,123 | Rahbek | Dec. 24, 1935 |
| 2,079,724 | Van Ranst | May 11, 1937 |
| 2,106,882 | Betz | Feb. 1, 1938 |
| 2,153,195 | Lilja | Apr. 4, 1939 |
| 2,214,901 | Griffin | Sept. 17, 1940 |
| 2,271,051 | Treckman | June 27, 1942 |
| 2,317,290 | McMuried | Apr. 20, 1943 |
| 2,417,850 | Winslow | Mar. 25, 1947 |
| 2,453,509 | Hugin | Nov. 9, 1948 |

OTHER REFERENCES

Raymond Engineering Laboratory Report, September 17, 1948.

National Bureau of Standards Publication, Technical Report 1213.